United States Patent Office 3,081,346
Patented Mar. 12, 1963

3,081,346
NOVEL 12a-(O-FORMYL)TETRACYCLINES
Charles R. Stephens, Jr., Niantic, and Robert K. Blackwood, Gales Ferry, Conn., assignors to Chas. Pfizer & Co., Inc., New York, N.Y., a corporation of Delaware
No Drawing. Filed Jan. 29, 1960, Ser. No. 5,364
12 Claims. (Cl. 260—559)

The present invention is concerned with a novel group of monoformate esters of the tetracycline antibiotics, the acid addition salts thereof, a process for their preparation and a process for the transformation thereof into a novel group of anhydrotetracycline antibiotics. The formate esters and the novel anhydro compounds are useful as antibacterial agents and as intermediates in the preparation of other biologically active substances. The formate esters of this invention comprise a group of tetracyclines in which the 12a-hydroxyl is esterified by a formyl group. They are suited for use as therapeutic agents.

Among the pharmaceutical and physiological properties which distinguish the 12a-O-monoformyltetracyclines of this invention from the parent antibiotics and related derivatives thereof is their insolubility in water and the common organic solvents. This is true of the amphoteric forms thereof in particular. The amphoteric substances therefore are especially adapted for use in the preparation of pharmaceutical suspensions, topical preparations, such as dusting powders and ointments, and for the repository parenteral forms for intramuscular use. They provide aqueous suspensions which have improved stability at slightly acidic pH values and a bland taste. This is true of the suspensions when containing the formyl derivative alone or in combination with additives such as glucosamine, its salts, and N-acetyl-glucosamine. They appear to be rapidly and completely absorbed from the gastrointestinal tract, particularly when administered in the hydrochloride form or other physiologically acceptable acid addition salt. They provide to animals protection against various types of infection either experimentally or naturally contracted.

The present invention includes within its scope the 12a-(O-formyl)tetracyclines conforming to the following structural formulae:

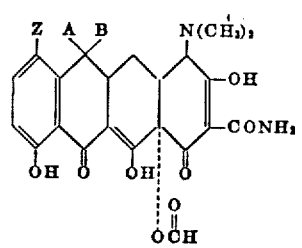

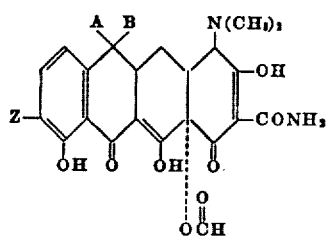

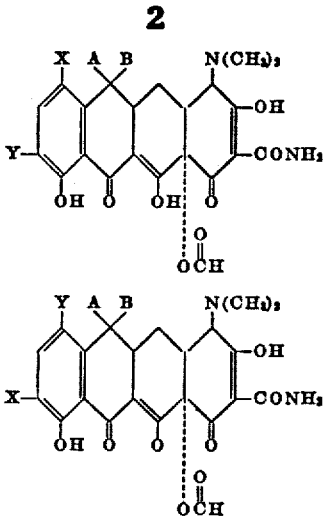

wherein A is selected from the group consisting of H and $CH_3$, B is selected from the group consisting of H and OH, Z is selected from the group consisting of hydrogen, halogen, cyano, cyanato, thiocyanato, nitro, arsenoxy and SR, R being a hydrocarbon group having up to 10 carbon atoms. X is either a nitro group or a halogen atom, and Y is a halogen atom. These formulae are not intended to depict a specific stereoisomeric form of these substances. For instance, the dimethylamino group may be in either the normal, or epi configuration. Similarly, the 11,12-keto enol system of these substances is mobile, either the 11 or the 12 oxygen atoms being in the hydroxyl form or both in the keto form.

One of the most prominent distinguishing physical characteristics of the 12a-monoformates of the above formulae is light absorption in the infrared region at 5.78 to $5.83\mu$. This absorption band is not found in the tetracycline antibiotics from which the present materials are derived. It appears to be characteristic of the formyl functional group. The amorphous forms and crystalline hydrochlorides of the present products, appear to absorb at shorter wave lengths, e.g. $5.78\mu$, than do the pure crystalline materials. The present substances can be further characterized by paper chromatography. Characteristic $Rf$ values are exhibited in various solvent systems as described hereinafter.

The process for the preparation of the 12a-(O-formyl)-tetracyclines involves treatment of a tetracycline antibiotic, for instance, tetracycline, chlortetracycline, bromtetracycline, 6-demethyltetracycline, 6-demethylchlortetracycline, 6-demethyl-6-deoxytetracycline or 6-deoxytetracycline and the D-ring substituted analogs of these substances with from 1 to 25 molecular proportions of acetoformic acid at a temperature of from about —30° C. to +50° C.

Acetoformic acid reagent suitable for the present process is prepared by mixing one volume of 100% formic acid with two volumes of acetic anhydride. Approximately 72 ml. of this reagent is equivalent to one mole of acetoformic acid anhydride. Excess of acetoformic acid reagent is employed when higher reaction temperatures are employed since the reagent is decomposed in the presence of basic substances, such as the tetracycline antibiotic starting materials, to provide acetic acid and carbon monoxide. This side reaction becomes increasingly rapid above 10° C. At 50° C. use of up to about twenty-five molecular proportions of acetoformic acid, which is equivalent to about 4 ml. of the acetoformic acid reagent per gram of antibiotic, is necessary. Therefore, it is preferred to operate below this temperature. As a practical matter, the range from 0 to 10° C. is preferred for best results and economy. When operating in this temperature range, from 1.5 to 2 milliliters of acetoformic acid reagent per gram of antibiotic reactant is satisfactory. An equimolecular proportion of the reagent is adequate at the lower level of the temperature range.

Diluents which are non-reactive and do not catalyze decomposition of the reagent at the reaction temperature can sometimes be advantageously employed in the present process. Illustrative of operable diluents are non-hydroxyl containing solvents such as dioxane, toluene, benzene, dimethylformamide, ethyl acetate, methyl isobutyl ketone, acetone, pyridine, quinoline, etc. Hydroxylated solvents such as the lower alkanols and glycols are not satisfactory due to the tendency of acetoformic acid reagent to react with these materials. It has been found that the present process is particularly adapted to the use of pyridine as a solvent medium. This substance has the effect of accelerating the reaction and causing highly selective monoformylation to occur which facilitates isolation of the pure monoformyl product. When selecting a reaction solvent, its propensity to react with the acetoformic acid reagent is first tested in a control run in the absence of the antibiotic component.

The present 12a-(O-monoformyl)tetracyclines, distinguished from prior tetracycline esters and acyl derivatives, are relatively subject to hydrolysis to provide the parent tetracycline antibiotic in biologically active form. Hydrolysis is facile in neutral and alkaline aqueous solutions, but relatively slow in acid solutions. This is illustrated by the half life values of 12a-(O-formyl)tetracycline in water at various pH's appearing in Table I.

TABLE I

*Hydrolysis Rate of 12a-(O-Formyl)Tetracycline*

| pH: | Half life (approx.)[1], min. |
| --- | --- |
| 7.5 | 5 |
| 6.0 | 35 |
| 4.0 | 240 |
| 2.0 | 360 |

[1] Based on ultra-violet assay; original concentration 1 mg./ml.

12a-(O-formyl)tetracycline hydrochloride is soluble in water. However, on standing the salt hydrolyzes to provide the highly water insoluble amphoteric 12a-(O-formyl)tetracycline free base which precipitates from solution. The free base is insoluble in water and the liquid monohydric alkanols and is even difficult to dissolve in dilute aqueous acids such as 0.01 N hydrochloric acid. 12a-(O-formyl)tetracycline hydrochloride is readily soluble in 0.01 N hydrochloric acid which solution is stable for a reasonable length of time at room temperature. Hydrolysis of the formyl group to provide a solution of biologically active tetracycline hydrochloride and formic acid does eventually occur.

This property of the present substances must be borne in mind when recovering the formyl compounds from reaction mixtures, and in preparing pharmaceutical formulations thereof. One recovery method involves simple evaporation of the excess acetoformic acid reagent, preferably under reduced pressure. Alternatively, the product can be precipitated with a non-solvent and recovered by filtration, centrifugation, or solvent extraction. With pyridine as a reaction solvent, a convenient recovery procedure involves pouring the pyridine solution into one or more volumes of ice water and extracting with ether. As the extraction progresses, in the case of 12a-(O-formyl)tetracycline, pyridine and other solubilizing solutes are removed from the solution, and amphoteric formyl- tetracycline crystallizes from the aqueous layer as the monohydrate. The same result can be achieved by acidification to pH 3–5. The free base form precipitates regardless of whether tetracycline free base or acid addition salt is used as starting material, or whether the extraction or acidification step is employed.

The 12a-(O-monoformyl)tetracyclines have substantially the same in vitro activity when measured by the conventional *K. pneumoniae* oxytetracycline turbidimetric bioassay as the unesterified tetracycline antibiotic to which they are related. They also have substantially the same in vivo antimicrobial spectra as the parent antibiotics.

Due to the similarity in activity of the 12a-(O-formyl)-tetracyclines to the tetracycline antibiotics now in therapeutic use, they can be administered in similar dosages for therapeutic purposes. Somewhat higher or lower dosages may, of course, be employed. For instance, the dosage in some instances can be reduced considerably due to better absorption from the gastrointestinal tract. On the other hand, a higher dosage on intramuscular injection of the material in the free base form may be employed due to the highly repository nature of the substance providing an effective blood level of the antibiotic for prolonged periods of time. The amphoteric products are well suited for oral administration due to their lack of bitter taste which characterizes the parent antibiotics.

The formylation process of the present invention is distinguished from prior tetracycline antibiotic acylation processes as applied to the tetracycline antibiotics in a number of respects. For instance, a different type of reagent is employed. It has been found that there is a little or no tendency for the antibiotic raw material to epimerize under the reaction conditions employed. The monoformyl derivatives produced by the present process have been consistently found to have the normal configuration at the 4-position. This is substantiated by hydrolysis with dilute (0.01 normal) aqueous sodium hydroxide. The substantially pure tetracycline antibiotic is recovered by this treatment to the exclusion of the corresponding epitetracycline antibiotic. Prior processes are sometimes found to lead predominantly to the acyl derivatives of the corresponding 4-epitetracycline antibiotics. This, of course, has obvious implications with regard to therapeutic use of the novel formyl compounds since a loss in therapeutic efficiency is usually encountered when the 4-epitetracycline antibiotic is administered.

The novel anhydro compounds which are prepared from the 12a-formates are known as 4a,12a-anhydrotetracyclines. In these substances, the A-ring, is aromatic, in addition to the D-ring which is normally aromatic in tetracycline compounds, and they are necessarily deficient a hydroxyl group at the 12a-position. This structural feature differentiates them from the 5a,6-anhydrotetracyclines in which the C and D rings are aromatic. The 4a,12a-anhydrotetracyclines have useful antimicrobial activity. Those having a $C_6$-hydroxyl are readily decomposed by mild heating at slightly acidic pH's to yield nontoxic biologically inactive end-products. 4a,12a-anhydrotetracycline, for instance, is readily transformed by mild acid treatment into terrarubein, a known biologically inactive degradation product of oxytetracycline. This combination of features suits these members of the class for use as food preservatives. All members of the class are useful as sun screen agents. The heat and acid lability of the 4a,12a-anhydro compounds containing a $C_6$-hydroxyl further distinguishes them from the 5a,6 anhydro compounds which are relatively stable to heat and acid.

Table II which follows contains the minimum inhibitory concentration for a variety of microorganisms against 4a,12a-anhydrotetracycline. These values were determined by the tube dilution technique. The activity of this substance is representative of the class, but variations in activity among specific compounds such as these having D-ring substituents, against the resistant Staphylococci are observed.

TABLE II

In Vitro Activity of 4a,12a-Anhydrotetracycline

| Organisms: | Minimum inhibitory concentration, (mcg./ml.) |
|---|---|
| Micrococcus pyogenes var. aureus | 50 |
| Micrococcus pyogenes var. aureus 400 | 50 |
| Micrococcus pyogenes var. aureus K3 | 25 |
| Micrococcus pyogenes var. aureus K4 | 12.5 |
| Streptococcus pyogenes | 50 |
| Streptococcus faecalis | 12.5 |
| Diplococcus pneumoniae | 25 |
| Erysipelothrix rhusiopathiae | 6.3 |
| Corynebacterium diphtheriae | 25 |
| Listeria monocytogenes | 200 |
| Bacillus subtilis | 6.3 |
| Clostridium perfringens | 50 |
| Lactobacillus casei | 100 |
| Phytomonas tumefaciens | 100 |
| Pasteurella multocida | 300 |
| Mycobacterium 607 | 50 |
| Mycobacterium berolinense | 6.3 |

Both the 12a-(O-formyl)tetracyclines and the 4a,12a-anhydrotetracyclines are of further interest as intermediates in the synthesis of the 12a-deoxytetracycline antibiotics. The aromatic A-ring of the latter can be selectively reduced to the cycloaliphatic A-ring characteristic of the 12a-deoxytetracyclines. Reduction selectively of the aromatic C-ring of the 5a,6-anhydrotetracyclines by contrast has not proven to be a useful synthetic method for the production of analogous 6-deoxy tetracyclines. Hydrogenolysis of the 12a-O-formyl group of the former to provide the 12a-deoxytetracyclines is the subject of copending application Serial Number 813,654, filed May 18, 1959, now U.S. Patent 3,002,021. In this connection, it should be noted that the present 4a,12a-anhydro-compounds can be prepared by synthesis from commonly available starting materials. Reduction thereof to 12a-deoxytetracyclines thus provides the missing link in a tetracycline total synthesis chain since introduction of the 12a-hydroxyl into 12a-deoxytetracycline has been described in the literature (J. Amer. Chem. Soc. 81, pp. 4748 and 4750 (1959)).

The 4a,12-anhydrotetracyclines claimed herein have the following formulas:

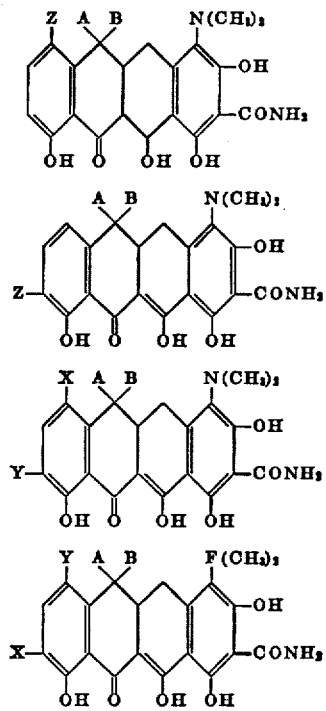

In these formulas the symbols A, B, X, Y and Z have the same meaning employed above in the formulas for the monoformates. These materials are prepared by cleavage of formic acid from the 12a-O-monoformates by heat treatment thereof. Pyrolysis of the 12a-monoformates is preferably accomplished by heating the formate at a temperature of about 90 to 120° C. for a time sufficient to effect cleavage of the 12a-O-formyl group as formic acid. The pyrolysis may require as much as four days at a temperature of 90° C. but is frequently completed considerably sooner at higher temperatures. For instance, 12a-O-formyl-6-deoxy-6-demethyltetracycline is converted to 4a,12a-anhydro-6-deoxy-6-demethyltetracycline in good yield in 18 hours in boiling toluene (111° C.).

The process is preferably carried out in solution in an inert organic solvent such as a liquid hydrocarbon, alkyl or aryl ketone, or hydrocarbon ether. Hydroxylic solvents such as alcohols and esters are to be avoided as solvents. The hydrocarbons, ketones, and ethers, are those in which the formate ester is soluble to some extent at the reaction temperature. A solubility of 0.02 gram per milliliter or more is a quite useful operating figure but solvents in which 12a-formates are soluble to a substantially lesser extent are also operable. Toluene is the preferred solvent.

The course of the pyrolytic reaction can be followed by periodic measurement of the ultra-violet absorption spectrum of the reaction mixture. Characteristic changes in the ultra-violet absorption spectrum occur as the 4a,12a-anhydro compound is formed. The 12a-monoformates employed as starting materials have ultra-violet absorption spectra very similar to that of the parent tetracycline antibiotics. Thus, 12a-O-formyltetracycline exhibits absorption maxima at 270 and 362 mµ when dissolved in methanol obtaining 0.01 mole per liter of hydrogen chloride. In the same solvent, 4a,12-anhydrotetracycline exhibits absorption maxima at 245, 327, 405 and 426 mµ. Thus, the 270 and 362 mµ maxima of the formate exhibit hypsochromic shifts and additional maxima 405 and 426 mµ appear. It is the appearance of the latter which is most readily measured for assay purposes. The absorption maxima occurring in the vicinity of 405 and 426 mµ are characteristic of the 4a,12a-anhydro compounds. It is the measurement of these maxima which serves as a useful analytical tool in following the course of the reaction.

An alternative guide to the extent to which the reaction has occurred is by direct measurement of the formic acid produced, for instance by acidimetric titration. For this purpose, the formic acid can be distilled from the reaction mixture as it is produced and the distillate titrated, or measurement can be made directly on the reaction mixture or aliquots thereof in this or other suitable fashion.

In this connection, it is to be noted that in the pyrolysis of 12a-O-formates of acid labile tetracyclines, it is advantageous to remove the by-product formic acid from the reaction zone. The acid labile tetracyclines are those containing both a methyl group and a hydroxyl group in the 6-position. Removal of the formic acid from the reaction zone is readily accomplished by distillation, neutralization, or chemical combination with a neutral acid scavenger such as ethylene oxide or propylene oxide. Neutralization is readily brought about by including a buffering agent or an alkaline material in the reaction mixture. Suitable buffers include sodium carbonate, potassium carbonate, sodium acetate, potassium phenoxide, and various soaps, such as sodium stearate, potassium palmitate, etc.

Reference has been made to toluene as the preferred solvent for pyrolytic deformylation. Other liquid hydrocarbons such as benzene, xylene, ethyl benzene, heptane, and octane, liquid aliphatic and aromatic ketones such as methyl isobutyl ketone, acetophenone, and hydrocarbon ethers, such as dibutyl ether and anisole may also be employed. It is not necessary to limit the solvent to one boiling at a temperature higher than 90° but this is, of course, convenient since pressure vessels are not required to achieve the necessary reaction temperature. When employing lower boiling hydrocarbon, ketone, and ether solvents such as benzene, methylethylketone or tetrahydrofuran as the reaction medium, it is necessary to carry out the process in an autoclave or other suitable pressure vessel.

The 4a,12a-anhydrotetracycline antibiotics of the present invention are characterized by their absorption of ultra-violet light at about 245, 327, 405 and 425 m$\mu$ when dissolved in 0.01 N methanolic hydrochloric acid and at 247 and 425 m$\mu$ when dissolved in 0.01 N methanolic sodium hydroxide. They are also characterized by the fact that they decompose without melting at temperatures in excess of 200° and fail to melt even at 300° C. They exhibit characteristic infrared maxima at about 6.3, 6.45, 7.1, and 7.5$\mu$. They are very insoluble substances, but can, nevertheless, be satisfactorily characterized by paper chromatography. They exhibit characteristic R$f$ values in such solvent systems as 1:1 benzene: chloroform saturated with water, 20:3 toluene:pyridine saturated with pH 4.2 McIlvaine buffer, 20:10:3 nitromethane:chloroform:pyridine saturated with pH 3.5 McIlvaine buffer, and ethylacetate saturated with water. They are, of course, less polar than the corresponding tetracycline antibiotics and thus, are carried closer to the solvent front in comparison thereto in a given solvent system. They are also less polar than the corresponding 12a-deoxytetracyclines, and therefore exhibit higher R$f$ values in various papergram solvent systems.

Alkaline solvent systems are preferred for the selective hydrogenation of the A-ring of the 4a,12a-anhydrotetracyclines. Temperatures in the range 20–160° C. may be employed. Hydrogenation catalysts comprised of finely divided palladium, rhodium, platinum, ruthenium, rhenium, and nickel are preferred as is the use of a lower alkanol as the solvent. Catalytic compounds of these metals such as rhenium heptaselonide are frequently applicable.

The selection of a solvent is rather severely restricted by the insoluble nature of the 4a,12a-anhydrotetracyclines. Water can serve as the solvent since the 4a,12a-anhydro compounds are somewhat soluble at alkaline pH's. The lower alkanols are in general preferred, however. They have adequate solvent capacity and they do not interfere with the hydrogenation reaction. Other solvents, however, can be used such as dichloroethane and ethers of ethylene glycol and diethylene glycol, such as dimethyl ethylene glycol and diethyl diethyleneglycol.

The hydrogenation pressure required varies from atmospheric to 2000 p.s.i.g. depending upon the catalyst employed. A distinct decrease in the rate of hydrogen uptake at the completion of the reaction is not observed, so it is necessary to interrupt the process when one molecular proportion of hydrogen has been absorbed. Of course, when additional functional groups susceptible of hydrogenation are present such as halogen or nitro, the process is interrupted after one mole of hydrogen in addition to the requirement of these additional groups has been absorbed. In such situations, two three, or more moles of hydrogen are needed.

Catalytic hydrogenation of 4a,12a-anhydro-6-deoxy-6-demethyltetracycline is illustrated by the following equation which is representative of the type of process discussed above.

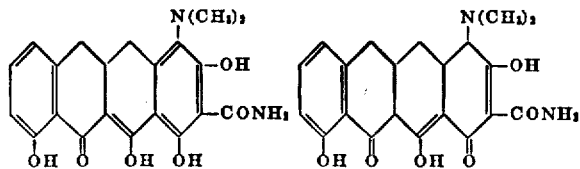

Thus it can be seen that the product resulting is simply a dihydro derivative of the 4a,12a-anhydro compound reduced.

Chemical methods of reduction are also applicable to this transformation. Particularly worthy of mention is the so-called Birch reduction (J. Chem. Soc. 434 (1944)) which involves treatment of the substrate with sodium or lithium dissolved in liquid ammonia to which about one molecular proportion (based on substrate) of an alkanol such as isoamyl alcohol is added. A modified Birch reaction (J.A.C.S. 74, 5701 (1952); and 76, 631 (1954)) may also be used. The modification enables higher reaction temperatures by employing liquid amines, e.g. ethylamine, in place of liquid ammonia. Metal hydride reductions employing for instance, a comparatively high proportion of a metal hydride such as sodium borohydride at elevated temperature (e.g. 50° C. and higher are used). A-ring reduction by either chemical or catalytic means is also applicable to the 4-desdimethylamino-4a,12a-anhydrotetracyclines which are prepared by the method of copending application Serial Number 5,336, filed January 29, 1960, now U.S. Patent 3,043,876.

Having now described our invention, the following examples are provided to illustrate its application to a number of specific situations. They are, however, not to be considered as limiting the invention in any way. The scope thereof is set forth by the appended claims.

This application is a continuation-in-part of copending application Serial No. 782,407, filed December 23, 1958, now abandoned.

EXAMPLE I

Twenty grams of anhydrous tetracycline is added in 40 ml. of pyridine. This mixture is cooled to 0° C. and 50 ml. of acetoformic acid reagent (V. C. Mehlenbacher, Organic Analysis, vol. I, Interscience Publishers, Inc., New York, p. 37) is added thereto in a drop-wise fashion during a period of 15 minutes. The temperature is kept in the range 5–8° during this period. The acetoformic acid reagent is conveniently prepared by mixing one volume of 100% formic acid with two volumes of acetic anhydride at 0° C. Improved results are sometimes achieved with this reagent if after the initial mixing process, it is warmed at 50° C. for about 15 minutes prior to use. After addition of the reagent to the tetracycline containing mixture, it is stirred for about ½ hour in an ice bath. The product is recovered by pouring the reaction mixture into ice water and extracting with ether until the product commences to crystallize from the aqueous layer. Precipitation of the amphoteric monoformyl compound can also be effected by adjustment of the aqueous solution to pH 4. The product is filtered and air dried to provide crystalline 12a-(O-formyl)tetracycline monohydrate. The yield is 23 grams, M.P. 163–164° C. dec., bioassay (K. pneumoniae) 925 mcg./mg. The ultraviolet absorption spectrum in methanolic hydrochloric acid is similar to that of tetracycline hydrochloride. The infrared spectrum resembles that of tetracycline hydrochloride but differs in that it has significant absorption bands at 3.84 and 6.04 m$\mu$, with a shoulder at 5.78 m$\mu$ 12-(O-formyl)tetracycline monohydrate is almost insoluble in water, and in methanol at room temperature.

Analysis.—Calcd. for $C_{23}H_{24}O_9N_2 \cdot H_2O$: C, 56.32; H, 5.34; N, 5.71; $H_2O$, 3.79. Found: C, 56.5; H, 5.34; N, 5.75; $H_2O$, 4.7.

The water of hydration can be removed by drying at 100° C. in a high vacuum for about one hour to provide the anhydrous free base.

Analysis.—Calcd. for $C_{23}H_{24}O_9N_2$: C, 58.47; H, 5.12; N, 5.93. Found: C, 58.5; H, 5.30; N, 6.10.

12a-(O-formyl)tetracycline has a substantially identical antimicrobial spectrum to that of tetracycline when measured in vitro by standard turbidimetric methods employing methanol or dimethylformamide to solubilize the product. When administered orally to human beings approximately one-half as much of the antibiotic activity can be recovered from an eight-hour urine sample as it is possible to recover when a similar dose of tetracycline is administered. Its ability to protect animals against various experimental infections is very similar to that of tetracycline.

EXAMPLE II 12a-(O-formyl)tetracycline monohydrate, 20 g., is refluxed with 500 ml. of toluene, and the water and formic acid condensed is recovered from the reflux return by means of a Dean Stark trap. After 5 hours of treatment in this fashion, a clear red solution is obtained. A mixture of formic acid and water is collected in the Dean Stark trap. On cooling of the solution, an amorphous solid precipitates. This intermediate is crystallized from hot wet 1,2-dichloroethane to provide 4a,12a-anhydrotetracycline which decomposes without melting at about 215° C. and fails to melt even at 300° C. This compound has the following structural formula. As has been indicated the 11,12-keto-enol system is in tautomeric equilibrium.

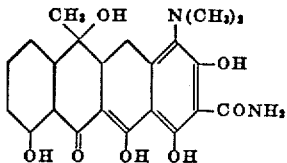

In addition to the different melting point observed for this material, it can be readily distinguished from the previously known 5a,6-anhydrotetracycline by its ultra-violet absorption spectrum. For convenience, the wave lengths of maximum absorption of 4a,12a-anhydrotetracycline and of 5a,6-anhydrotetracycline are arranged side by side in Table III.

TABLE III

*Ultra-Violet Absorption Spectra of Anhydrotetracyclines*

| In 0.01 N methanolic HCl | | In 0.01 N methanolic NaOH | |
|---|---|---|---|
| 4a,12a, m$\mu$ | 5a-6, m$\mu$ | 4a,12a, m$\mu$ | 5a-6, m$\mu$ |
| 245 | 275 | 247 | 272 |
| 305 | ----- | ----- | ----- |
| 405 | ---- | ---- | ---- |
| 426 | 425 | 425 | 430 |

4a12a-anhydrotetracycline exhibits absorption in the infrared region of the spectrum at the following wave lengths: 6.29, 6.45, 7.14 and 7.47$\mu$. There measurements were made employing a KBr pellet containing 1% of the test compound. The substance is further characterized by the R$f$ values in a number of solvent systems these are arranged in Table IV. The above material analyzes correctly for tetracycline less one mole of water.

Analysis.—Calcd. for $C_{22}N_{22}O_7N_3$: C, 61.96; H, 5.20; N, 6.57. Found: C, 61.99; H, 5.29; N, 6.34.

TABLE IV

*R$f$ Values in Various Solvent Systems*

| Mobile Phase | Immobile Phase | R$f$ value |
|---|---|---|
| 1:1 benzene:chloroform saturated with water (WB). | pH 4.2 buffer | 0.86. |
| 20:3 toluene:pyridine saturated with pH 4.2 buffer (GB). | pH 4.2 buffer | 0.88. |
| 20:10:3 nitromethane:chloroform: pyridine (FDA). | pH 3.5 buffer | 0.90. |
| Ethyl acetate saturated with water (RL). | pH 3.5 buffer | solvent front. |

EXAMPLE III

12a(O-formyl)tetracycline monohydrate prepared as described in Example I, 25 g., is slurried in 200 ml. of methyl alcohol. A mixture of 7.5 ml. of concentrated hydrochloric acid and 50 ml. of methanol is added to the slurry. A clear solution forms on brief mixing. This solution is then poured into 2500 ml. of diethyl ether. Crude 12a-(O-formyl)tetracycline hydrochloride precipitates and is recovered by filtration. This product is crystallized by stirring in acetone. 12a-(O-formyl)-tetracycline hydrochloride when so purified and dried in a high vacuum at 65° C. yields 18.5 g. of pure crystalline material, M.P. 196–204° C. dec.; bioassay 900 mcg./mg. (*K. pneumoniae* oxytetracycline assay); ultra-violet absorption maximum in 0.01 normal aqueous hydrochloric acid 270 m$\mu$; infrared absorption (1% KBr pellet) exhibits a typical maximum at 5.77$\mu$. The R$f$ values on papergrams employing the solvent systems described above in Table IV are as follows: FDA, 0.63; GB, 0.27; WB, 0.05; RL, 0.65. Partial hydrolysis of the product during preparation of the papergram is evident by the appearance of a tetracycline spot and a streak between that area and the spot corresponding to the monoformyl derivatve.

Analyss.—Calcd. for $C_{23}H_{25}O_9N_2Cl$: C, 54.28; H, 4.95; N, 5.50; Cl, 6.97. Found: C, 54.14; H, 5.15; N, 5.45; Cl, 6.8.

The in vitro activity of this material is substantially identical to that of tetracycline. It is also equivalent to tetracycline in various animal protection tests, and provides substantially the same antibiotic concentrations in the blood serum when administered orally to human beings as are obtained with tetracycline itself.

EXAMPLE IV

The procedure of Example I is repeated substituting chlortetracycline for tetracycline. The product is not recovered directly, however, in pure crystalline condition by crystallization from the aqueous layer during ether extraction. Removal of the solvent and recrystallization of the residue is necessary. 12a-(O-formyl)chlortetracycline is characterized by R$f$ values 0.52 in the solvent system designated GB above, and exhibits an infrared absorption band (KBr pellet) at 5.78$\mu$.

EXAMPLE V

The following general procedure is applicable to the preparation of all of the compounds of the present invention and accordingly is useful for the preparation of:

12a-(O-dormyl)bromtetracycline
12a-(O-formyl)-6-demethyltetracycline
12a-(O-formyl)-6-demethyl-7-chlortetracycline
12a-(O-formyl)-6-demethyl-6-deoxytetracycline
12a-(O-formyl)-6-deoxytetracycline
12a-(O-formyl)-7-iodo-6-deoxytetracycline
12a-(O-formyl)-9-fluoro-6-deoxytetracycline
12a-(O-formyl)-7-cyano-6-demethyltetracycline
12a-(O-formyl)-9-thiocyanato-6-demethyltetracycline
12a-(O-formyl)-7-cyanato-6-demethyltetracycline
12a-(O-formyl)-7-nitro-6-demethyl-6-deoxytetracycline
12a-(O-formyl-9-bromo-6-deoxy-6-demethyltetracycline
12a-(O-formyl)-7-phenylmercapto-6-deoxy-6-demethyltetracycline
12a-(O-formyl)-7-benzylmercapto-6-deoxy-6-demethyltetracycline
12a-(O-formyl)-7-butylmercapto-6-deoxy-6-demethyltetracycline
12a-(O-formyl)-7-methylmercapto-6-deoxy-6-demethyl tetracycline
12a-(O-formyl)-7-bromo-9-nitro-6-deoxy-6-demethyltetracycline
12a-(O-formyl)-7-nitro-9-bromo-6-deoxy-6-demethyltetracycline
12a-(O-formyl)-7-bromo-9-nitro-6-deoxytetracycline
12a-(O-formyl)-7,9-dibromo-6-deoxy-6-demethyltetracycline
12a-(O-formyl)-7,9-dichloro-6-deoxy-6-demethyltetracycline
12a-(O-formyl)-7,9-diiodo-6-deoxy-6-demethyltetracycline

12a-(O-formyl)-7-arsenoxy-6-deoxy-6-demethyltetracycline

The antibiotic, 10 g., is dissolved in 20 ml. of pyridine and treated with 15–20 ml. of acetoformic acid reagent prepared by mixing one volume of acetic anhydride with one volume of 100% formic acid at 0° C. The acetoformic acid is added gradually to a solution of the antibiotic in the pyridine at 0° C. in order to maintain the reaction temperature within reasonable limits that is, less than 50° C. and preferably less than 10° C. The mixture is then stirred for 1 hour at 0° C. and for an additional hour at room temperature. The mixture is then added to 200 ml. of diethyl ether with stirring. The crude amorphous product precipitates, it is collected, and crystallized from a suitable solvent. The solvents which have proven to be generally useful include non-hydroxylic solvents such as acetone, dioxane, tetrahydrofuran, etc. The products are readily differentiated from the parent antibiotics by their solubility properties, infrared absorption, and also by means of their Rf values in the various solvent systems listed in Example II. The hydrochloride salts of these materials can be readily prepared as described in Example III. Other pharmaceutically acceptable acid addition salts can be prepared by routine adaptation of this procedure to the appropriate acids such as phosphoric acid, nitric acid, hydrobromic acid, hydroiodic acid, sulfuric acid, p-toluene sulfonic acid, etc. The acid addition salts are uniformly more soluble in water and dilute acids than are the free base materials. The D-ring substituted tetracyclines, and D-ring disubstituted tetracyclines required as intermediates for the preparation of these substances are prepared according to the methods described in copending application Serial Number 847,867 filed October 22, 1959.

EXAMPLE VI

The procedure of Example I is repeated employing an equimolar proportion of acetoformic acid reagent with respect to the tetracycline charged. The reaction including the mixing of the reactants is carried out at −50° C. A reaction period of 24 hours is employed. The product is recovered in the fashion described and characterized by papergram, ultraviolet, and infrared absorption.

EXAMPLE VII

The process of Example I is repeated employing 80 ml. of acetoformic acid reagent and a reactant mixing temperature of 50° C. rather than of 5 to 8° C. When all of the acetoformic acid reagent has been added at this temperature, the mixture is poured directly into ice water omitting the ½ hour mixing period. Monoformyltetracycline is then recovered as before.

EXAMPLE VIII 6-deoxy-6-demethyltetracycline hydrochloride, 10 g., is dissolved in 20 ml. of pyridine. In general, either the amphoteric form or a salt of the antibiotics can be employed for the conduct of the formylation process. It is preferred, however, to employ that form of the antibiotic starting material which is most soluble in pyridine, the preferred reaction solvent. In this particular instance, the hydrochloride salt is the form of the antibiotic most soluble in pyridine. With tetracycline itself, however, the anhydrous amphoteric form is the more soluble and is, therefore, the preferred reactant. The pyridine solution of the 6-deoxy-6-demethyltetracycline hydrochloride is then treated with 15 ml. of the acetoformic acid reagent referred to in Example I at such a rate that the internal temperature of the mixture remains at 10° C., when the reaction flask is immersed in an ice bath. After the addition is complete, the mixture is allowed to stir for an additional 15 minutes in the ice bath. It is then added to approximately 1 liter of diethyl ether. 12a-(O-formyl)-6-deoxy-6-demethyltetracycline precipitates. It is collected, washed with ether, and dried. It exhibits a biological assay of 250–400 mcg./mg. and exhibits infrared absorption maxima at 5.78 and 6.04μ. In the solvent system, 20:3, toluene:pyridine saturated with pH 4.2 buffer (system GD) 12a-(O-formyl)-6-deoxy-6-demethyltetracycline exhibits an Rf value of 0.7 with a streak to the position corresponding to Rf 0.4. The Rf 0.4 position corresponds to that of 6-deoxy-6-demethyltetracycline in this papergram solvent system and is a reflection of the hydrolysis of the 12a-(O-formyl) group during preparation of the chromatogram.

EXAMPLE IX

A portion of the 12a-(O-formyl)-6-deoxy-6-demethyltetracycline prepared in Example VIII, weighing 2.5 g., is dissolved in 125 ml. of toluene. The heterogeneous mixture is refluxed for 24 hours, filtered while hot, and the solvent evaporated. The residue is recrystallized from ethylene dichloride to provide pure 4a,12a-anhydro-6-deoxy-6-demethyltetracycline in a yield exceeding 50% of the calculated amount, M.P. 240–243° C. dec., ultraviolet absorption maxima (C 1% N 0.01 N methanolic HCl) 248, 331, 403, and 423 mμ. As compared to the ultra-violet absorption spectrum of 4a,12a-anhydrotetracycline, the 331 maximum is relatively weaker and the 403 and 423 maxima are relatively stronger.

*Analysis.*—Calcd. for $C_{21}H_{20}O_6N_2$: C, 63.63; H, 5.09; N, 7.06. Found: C, 63.65; H, 5.08; N, 7.08.

EXAMPLE X

The procedure of Example IX is repeated employing as starting materials the 12a-(O-formyl)tetracyclines of Example V to obtain the corresponding 4a,12a-anhydro compounds.

EXAMPLE XI

The procedure of Example II is repeated employing 12a-(O-formyl)-chlortetracycline as the starting material. 4a,12a-anhydro-7-chlortetracycline is produced in substantially the same fashion as described for tetracycline.

EXAMPLE XII

The procedure of Example II is repeated but no provision is made for removal of the condensed water and formic acid from the reflux return. Instead, 10 g. of the following substances are added to the reaction mixture to serve as neutralizing agents: sodium carbonate, potassium carbonate, sodium acetate, potassium phenoxide, sodium stearate, and potassium palmitate.

EXAMPLE XIII

The procedure of Example XI is repeated employing propylene oxide as a neutral acid scavenger rather than removing the formic acid by distillation.

What is claimed is:
1. 12a-[O-formyl]tetracyclines selected from the group consisting of compounds having the formulas:

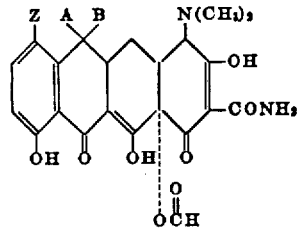

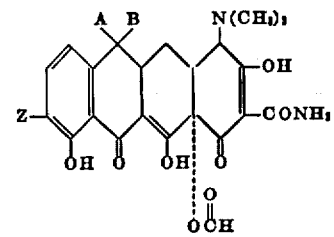

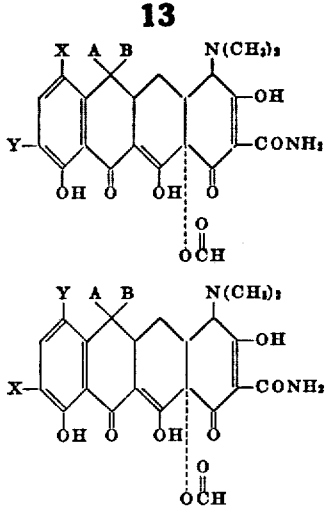

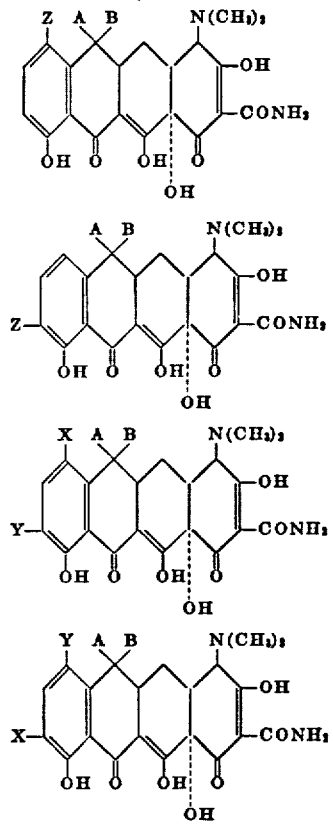

wherein A is selected from the group consisting of R and $CH_3$, B is selected from the group consisting of H and OH, Z is selected from the group consisting of hydrogen, halogen, cyano-, cyanato, thiocyanato, nitro, arsenoxy, and SR, R being a hydrocarbon having up to 10 carbon atoms, X is selected from the group consisting of nitro and halogen, Y is a halogen atom, and the acid addition salts and 4-epimers thereof.

2. 12a-(O-formyl)-7-chlortetracycline.
3. 12a-(O-formyl)-6-demethyltetracycline.
4. 12a-(O-formyl)-6-demethyl-6-deoxytetracycline.
5. 12a-(O-formyl)-6-deoxytetracycline.
6. 12a-(O-formyl)-7-bromtetracycline.
7. 12a-(O-formyl)tetracycline.
8. 12a(O-formyl)tetracycline hydrochloride.
9. A process for the preparation of 12a-(O-formyl)-tetracycline antibiotic which comprises mixing a tetracycline antibiotic selected from the group consisting of compounds having the formulae:

and $CH_3$, B is selected from the group consisting of H and OH, Z is selected from the group consisting of hydrogen, halogen, cyano-, cyanato, thiocyanato, nitro, arsenoxy, and SR, R being a hydrocarbon having up to 10 carbon atoms, X is selected from the group consisting of nitro and halogen, Y is a halogen atom and the acid addition salts and 4-epimers thereof, with from 1 to 25 molecular proportions of acetoformic acid at a temperature of from $-30°$ C to $+50°$ C.

10. The process of claim 9 wherein one part by weight of said tetracycline antibiotic is dissolved in approximately two parts by weight of pyridine and treated with approximately 1.5 to 2 milliliters of acetoformic acid reagent per gram of said antibiotic, said reagent consisting of a mixture of one part by volume of 100% formic acid and two parts by volume of acetic anhydride, at a temperature of 0° C. to 10° C. for from about 15 minutes to 3 hours.

11. 4a,12a-anhydrotetracyclines selected from the group consisting of compounds having the formulae

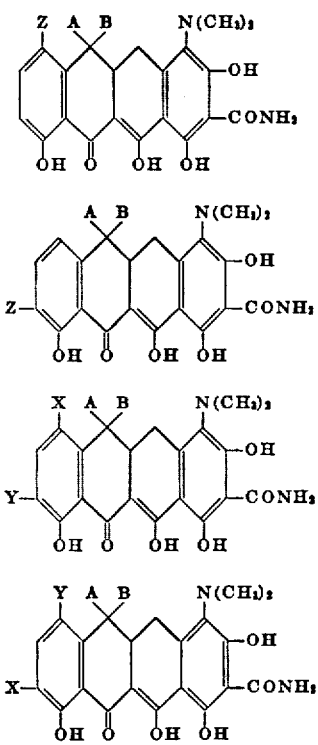

wherein A is selected from the group consisting of H and $CH_3$, B is selected from the group consisting of H and OH, and X and Y are each selected from the group consisting of hydrogen, halogen, cyano-, cyanato, thiocyanato, nitro, arsenoxy, and SR, R being a hydrocarbon having up to 10 carbon atoms, X is selected from the group consisting of nitro and halogen, Y is a halogen atom, and the acid addition salts thereof.

12. The process which comprises heating a 12a-(O-monoformyl)tetracycline selected from the group having the formulae

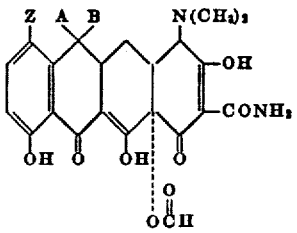

wherein A is selected from the group consisting of R

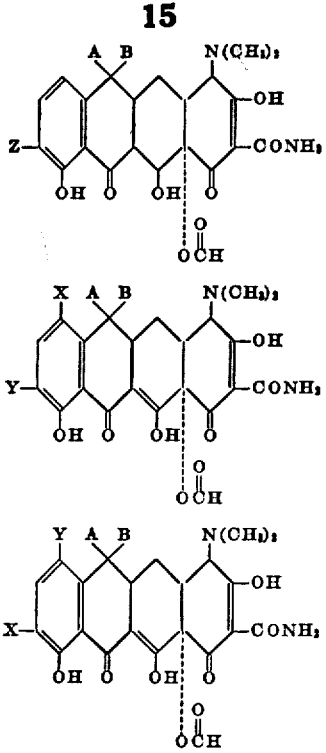

wherein A is selected from the group consisting of H and CH₃, B is selected from the group consisting of H and OH, Z is selected from the group consisting of hydrogen, halogen, cyano-, cyanato, thiocyanato, nitro, arsenoxy, and SR, R being a hydrocarbon having up to 10 carbon atoms, X is selected from the group consisting of nitro and halogen, Y is a halogen atom and the acid addition salts thereof, in the presence of an inert organic solvent for said 12a-(O-monoformyl)tetracycline, said solvent being selected from the group consisting of liquid hydrocarbons, ketones, and ethers at a temperature of about 90° C. to 120° C. for a time sufficient to result in pyrolysis of the 12a-formyl group as formic acid.

References Cited in the file of this patent

UNITED STATES PATENTS

| | | |
|---|---|---|
| 2,812,349 | Gordon | Nov. 5, 1957 |
| 2,922,817 | Green | Jan. 26, 1960 |

FOREIGN PATENTS

| | | |
|---|---|---|
| 744,019 | Great Britain | Jan. 26, 1956 |
| 748,724 | Great Britain | May 9, 1956 |
| 785,047 | Great Britain | Oct. 23, 1957 |

OTHER REFERENCES

Noller: Chemistry of Organic Compounds, published by W. B. Saunders Co. (Philadelphia), pages 146–147 (1951).

Lucas: Organic Chemistry (2nd ed.), published by American Book Co., New York, pages 172–173 (1953).

Stephens et al.: Journal American Chemical Society, vol. 76, pages 3568–3575 (1954).

Stephens et al.: Journal American Chemical Society, vol. 80, pages 5324–25 (Oct. 5, 1958).

UNITED STATES PATENT OFFICE
CERTIFICATE OF CORRECTION

Patent No. 3,081,346            March 12, 1963

Charles R. Stephens, Jr., et al.

It is hereby certified that error appears in the above numbered patent requiring correction and that the said Letters Patent should read as corrected below.

Column 2, lines 11 to 20, the formula should appear as shown below instead of as in the patent:

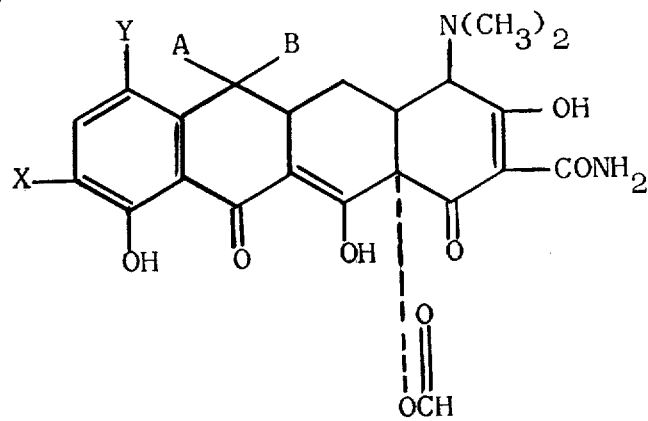

column 5, lines 47 to 53, change the single bond to a double bond betwen the number 11a and 12 carbon atoms; column 7, lines 68 to 74, between the formulae insert " ⟶ "; column 8, line 57, after "5.78 mμ" insert a period; column 9, lines 18 to 24, change the single bonds between the 7 and 8, 9 and 10, and 6a and 10a carbon atoms, respectively, to double bonds; line 47, after "4a" insert a comma; same column 9, line 49, for "There" read -- These --; column 10, line 45, for "-cormyl" read -- —formyl --; column 13, lines 21 and 75, for "R", each occurrence, read -- H --; column 14, line 6, for "halogen," read -- halogen and --; line 56, for "and X and Y are each" read -- Z is --; same column 14, line 60, for "halogen," read -- halogen and --; column 15, lines 1 to 10, change the single bond to a double bond between the number 11a and 12 carbon atoms; column 16, line 5, for "halogen," read -- halogen and --.

Signed and sealed this 12th day of November 1963.

(SEAL)
Attest:
ERNEST W. SWIDER

Attesting Officer

EDWIN L. REYNOLDS
Acting Commissioner of Patents